Figure 1:
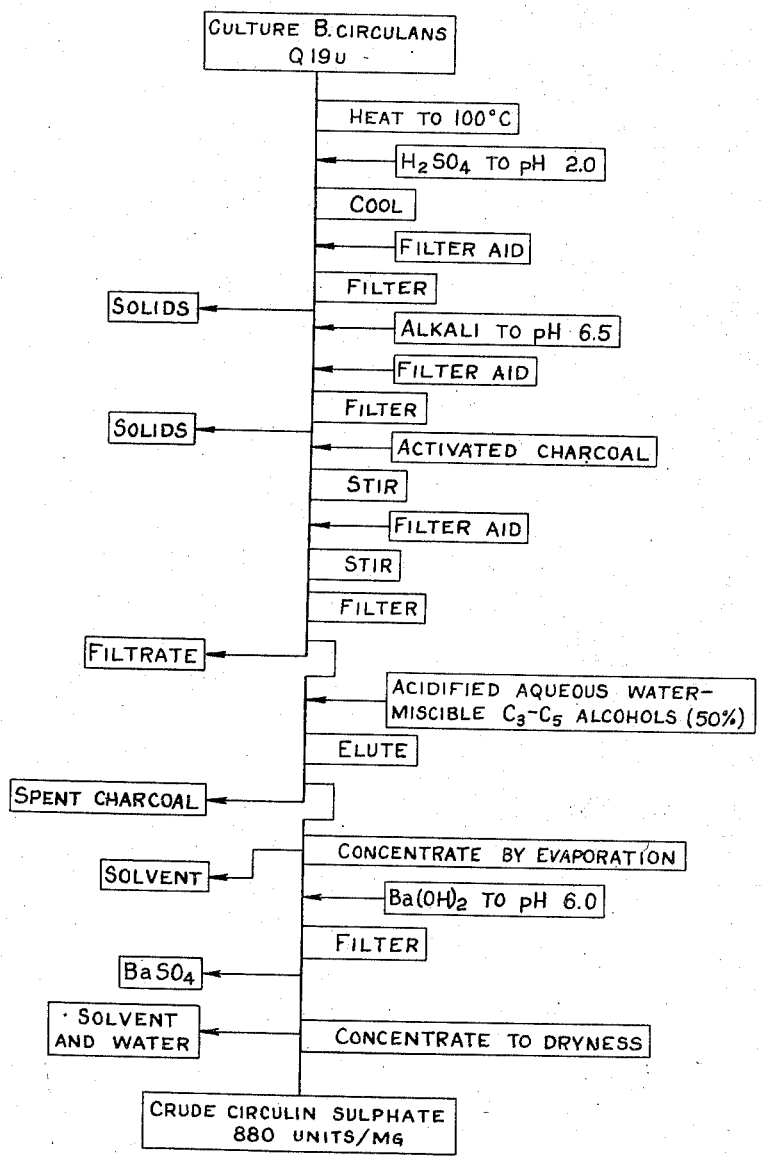

(EXAMPLE 3)

(EXAMPLES 4, 5 AND 6)

DUREY H. PETERSON
BYRON E. LEACH
Inventors (EXAMPLE 4)

Jan. 29, 1957  D. H. PETERSON ET AL  2,779,705
CIRCULIN DERIVATIVES AND CIRCULIN RECOVERY
Filed May 6, 1949  4 Sheets-Sheet 4

(EXAMPLES 5 AND 6)

DUREY H. PETERSON
BYRON E. LEACH
Inventors

United States Patent Office 2,779,705
Patented Jan. 29, 1957

2,779,705

CIRCULIN DERIVATIVES AND CIRCULIN RECOVERY

Durey H. Peterson and Byron E. Leach, Kalamazoo, Mich., assignors to The Upjohn Company, Kalamazoo, Mich., a corporation of Michigan Application May 6, 1949, Serial No. 91,858

9 Claims. (Cl. 167—65)

This invention relates to a new and useful microbial inhibitor, herein designated as circulin, the process for preparing the same by cultivation under particular controlled conditions of specific strains of the microorganism *Bacillus circulans*, the isolation of circulin from fermentation broths containing the same and purification of circulin.

On organism *Bacillus circulans* is described in Bergey's Manual of Determinative Bacteriology, 6th edition, Williams and Wilkins, Blatimore, 1948, at page 722. This organism is found in soil and dust and was first isolated from tap water. The particular strain of this organism which produces circulin, and which is designated *Bacillus circulans* Purdue Q19u, NRRL B-1359, was isolated from the soil. This organism gives a positive Voges-Proskauer reaction, which is at variance with other known strains of *Bacillus circulans*.

It has now been found, according to the present invention, that, upon cultivation of this particular strain of the microorganism *Bacillus circulans* Purdue Q19u in carbohydrate-containing nutrient media, a new substance, herein designated circulin, can be isolated from the resulting culture broth. The procedure produces two fractions, A and B, of which fraction A predominates. Dowling et al., Science 116, 147 (1952); Peterson and Reineke, J. Biol. Chem. 181, 95 (1949). This new substance, circulin, is a polypeptide containing free amino groups and amide (peptide) linked nitrogen. Although pure circulin salts are remarkably stable, the free base, obtained at a pH of approximately 11.0, is unstable and is best recovered, as is steptomycin, in the form of its salts, such as the sulfate, hydrochloride and others, the activity of these salts in adversely modifying the vital functions of specific microorganisms being proportional to their circulin content. Pure circulin has an activity of approximately 6300 *E. coli* units per milligram, assayed in accordance with Murray et al., J. Bact. 57, 305 (1949).

Circulin sulfate is an amorphous solid having a decomposition point of approximately 226 to 228 degrees centigrade, $[\alpha]_D^{25}$=minus 61.6 degrees (C=1.25 in water). It gives a negative Sakaguchi test, indicating the absence of the amino acid arginine; a negative xanthoproteic reaction, indicating the absence of aromatic amino acids; negative Knoop's test for histidine and contains no carbon-sulfur linkages. Nitrous acid (Van Slyke reaction) produced deamination and reduces the activity to approximately 5 percent that of the original circulin. Analysis of circulin sulfate shows C, 44.60 percent; N (Dumas), 16.0 percent; H, 7.47 percent; and ionic sulfate, 21.3 percent. Circulin sulfate has an approximate molecular weight of 1200 based on its ionic sulfate content and an empirical formula of $C_{39}H_{74}O_9N_{12}.2\frac{1}{2}H_2SO_4$ or a multiple thereof. Approximately five of the nitrogens are present as amino nitrogen, the remainder being in amide linkage, as is shown by analysis for amino nitrogen before hydrolysis, which is 7.5 percent, and amino nitrogen analysis after hydrolysis, which is 15.8 percent with no free ammonia being evolved. Circulin sulfate when digested with a 1 percent crude trypsin solution containing lipase at 37 degrees centigrade and pH 8.0 to 8.5 shows a loss of activity against *E. coli* of from 50 to 70 percent in from 96 to 144 hours. Analysis for amino acids on acid-hydrolyzed circulin by the paper chromatography procedure of Consden, Gordon and Martin, Biochem. J., 1944, vol. 38, page 224, shows the presence of d-leucine (7 to 8 percent), d-threonine (8 to 9 percent), alpha,gamma-diaminobutyric acid and the absence of serine and phenylalanine. Ether extraction of the acid-hydrolyzed material gives pelargonic or an optically active acid isomeric with pelargonic acid. Circulin sulfate has no significant peaks in its ultraviolet absorption spectrum, which is indicative of the absence of phenyl groups.

Circulin hydrochloride has a melting point of 232 to 236 degrees centigrade with decomposition, $[\alpha]_D^{25}$= minus 60.1 degrees (C=2.094 in water), and assays approximately 6500 units per milligram. The picrate assays 3200 to 3600 units per milligram and has a melting point of 160 to 168 degrees centigrade with decomposition. The helianthate assays 2600 to 2800 units per milligram and has a melting point of 218 to 222 degrees centigrade with decomposition. The reineckate assays 2400 to 3300 units per milligram and darkens at a temperature of 185 to 195 degrees centigrade but undergoes no further visible change upon heating to 240 degrees centigrade.

The formaldehyde derivative, formed by the addition of formalin solution to an aqueous solution of circulin hydrochloride and slow precipitation of the compound with sodium hydroxide, assays 6300 units per milligram and melts at 242 to 250 degrees centigrade with decomposition.

The 2,4-dinitrodiphenyl derivative of circulin, formed by reaction with 2,4-dinitrofluorobenzene, is a yellow water-insoluble substance having a melting point of 158 to 163 degrees centigrade, softening at a temperature of 135 to 140 degrees centigrade. It is inactive.

The acetyl derivative of circulin is water-insoluble and also lacks activity. It darkens at a temperature of 235 to 245 degrees centigrade without melting.

Circulin is in some respects similar to the antibiotics designated in the art and herein as polymyxin A, polymyxin B, polymyxin C and polymyxin D. Polymyxins A, B and C are also known as aerosporins A, B and C, while polymyxin D is also called polymyxin without a distinguishing letter. Circulin differs from polymyxins B, C and D in chemical composition as is shown in the following table of amino acid components:

TABLE 1

| Constituent | Antibiotic | | | | |
|---|---|---|---|---|---|
| | Circulin | Polymyxin | | | |
| | | A | B | C | D |
| leucine | + | + | + | − | + |
| phenylalanine | − | − | + | + | − |
| threonine | + | + | + | + | + |
| serine | + | − | − | − | + |
| alpha, gamma-diaminobutyric acid | + | + | + | + | + |
| pelargonic or related acid | + | + | + | + | + |

Polymyxin (polymyxin D) is not affected by digestion with pepsin, pancreatin, erepsin and trypsin (P. G. Stansly and N. H. Ananenko, Archiv. Biochem., 1947, vol. 15, pages 473–5) and crude trypsin does not affect polymyxins A and C, but circulin and polymyxin B are destroyed to the extent of 50 to 70 percent in 96 to 144 hours by digestion with crude trypsin, yet neither circulin nor polymyxin B are inactivated by crystalline trypsin. Polymyxin B and circulin differ in their amino acid contents. Though polymyxin A and circulin have similar amino acid content they differ markedly in their reaction toward lipase.

The microbial inhibitor of this invention is prepared by cultivating a circulin-producing strain of *Bacillus circulans*, such as *Bacillus circulans* Purdue Q19u, preferably under submerged aerobic conditions, in a nutrient medium containing a carbohydrate, an ammonium salt, potassium dihydrogen phosphate, and an inorganic buffer system. A preferred medium comprises dextrin together with dried brewer's yeast or rolled oats as a source of protein and to stimulate production. The substance thus produced is separated from the culture medium, after destruction of the organism and coagulation of the protein material by heat, either by precipitation as a complex with alkylated aromatic sulfonates, or by adsorption on activated charcoal, eluting the circulin from the adsorbate with acidified aqueous alcohols having from 3 to 5 carbon atoms inclusive, recovering the crude circulin from the eluate and purifying the crude product by chromatographic absorption of aqueous solutions on activated carbon.

For the preparation of circulin, a culture medium which is preferred is one containing approximately

| | Parts |
|---|---|
| Dextrin or starch | 20 |
| Ammonium sulfate ($(NH_4)_2SO_4$) | 10 |
| Dried brewer's yeast or rolled oats | 20 |
| Potassium chloride (KCl) | 4 |
| Calcium carbonate ($CaCO_3$) | 10 to 16 |
| Potassium dihydrogen phosphate ($KH_2PO_4$) | 0.2 to 0.4 |
| Water q. s. | 1000 |

The medium is brought to a pH of approximately 6.5 by addition of sulfuric acid and thereafter is sterilized by heating and cooled. With this medium it is possible to reach a production of approximately 5000 units per milliliter in three days. Circulin can be produced also be using certain other carbohydrate and protein-containing media.

The medium is inoculated with a vegetative culture (as opposed to a spore culture) of a circulin-producing strain of *Bacillus circulans*, preferably in an amount of about 5 percent by volume of the nutrient medium. The inoculating culture is obtained by transferring the circulin-producing strain of *Bacillus circulans* grown on agar slants to 100-milliliter portions of a corn sugar-brewer's yeast medium having the composition specified hereinabove but containing no dihydrogen potassium phosphate and wherein the dextrin can be replaced by corn sugar, and incubating it under submerged aerobic conditions at 24 degrees centigrade until the first signs of spore formation appear. This inoculum may be used directly in large-scale fermentations but is preferably transferred to 5-gallon bottles containing 3 liters of the corn sugar-brewer's yeast medium specified hereinabove containing dihydrogen potassium phosphate. The culture of *Bacillus circulans* thus obtained contains vegetative growth, which is the preferred form for inoculation, and may be added to large-scale fermenters in an amount equal to approximately 5 percent by volume of the medium used.

The fermentation is conducted at 24 degrees centigrade for from two to five days with the maximum yield being obtained shortly after 48 hours of incubation. Air is passed into the agitated, inoculated medium at a preferred rate of about 0.6 volume of air per volume of medium per minute. Iron tanks should be avoided as they retard the formation of circulin, although iron does not itself prevent growth of the organism.

Figure 2:
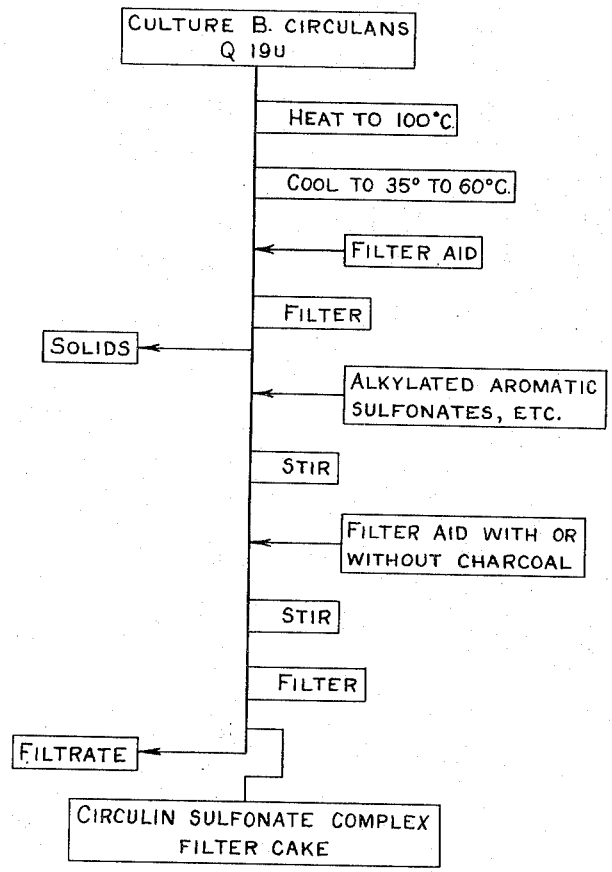
Figure 3:
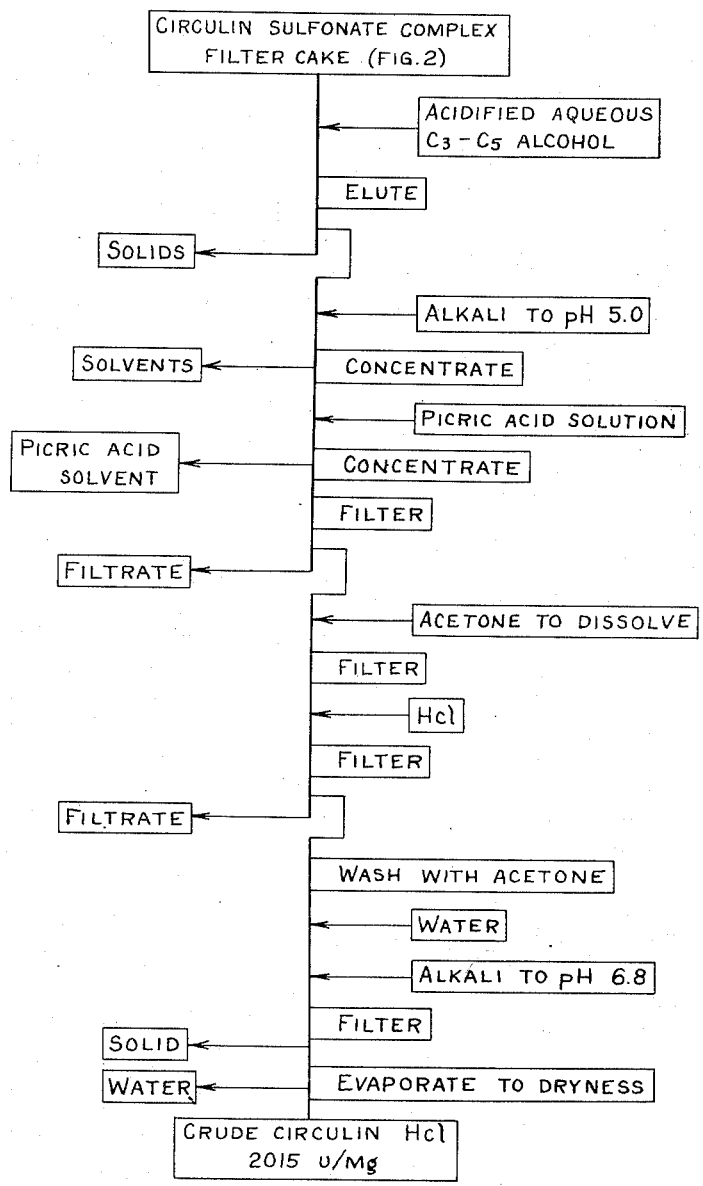
Figure 4:
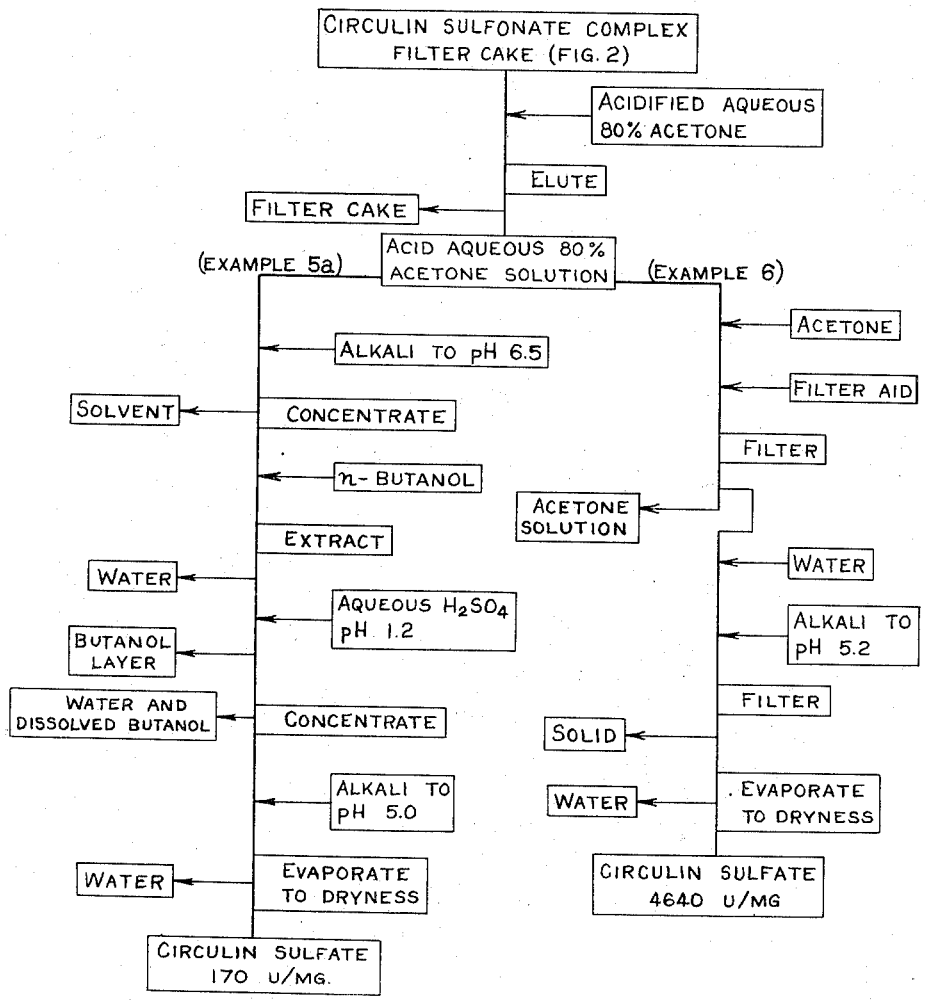

The accompanying four drawings are flow sheets of processes for recovery of circulin from the fermentation brew, as described hereinafter. Figure 1 is directed to the entire process of Example 3 hereinafter, Figure 2 to the first portion of the treatments described in Examples 4, 5 and 6 and is similar to the first portion of the process of Figure 1 (Example 3). Figure 3 together with Figure 2 are the flow sheet of the process of Example 4, while Figure 4 together with Figure 2 are the flow sheets of the processes of Examples 5 and 6.

After the fermentation has proceeded for the desired length of time, as determined by assay of the brew for circulin content, the brew is heated in the fermenter to 100 degrees centigrade for about 10 minutes to kill the *Bacillus circulans*, open the bacterial cells, coagulate the suspended material and otherwise aid in the subsequent filtration. The hot brew is cooled to between approximately 25 and approximately 60 degrees centigrade and filtered, using a filter aid. The brew may be acidified to a pH within the range of 2 to 3 with sulfuric acid prior to filtration, if desired. The antibiotic substance is recovered from the clarified beer by adsorption on activated charcoal or is precipitated therefrom by the addition of anionic sulfonyl-radical containing surface-active agents such as alkylated aromatic sulfonates, oleic acid esters of sulfonated aliphatic compounds and aliphatic ester sulfates, which form complexes therewith. A diatomaceous earth filter aid is preferably added to assist in the separation by filtration of the circulin from the brew. These treatments are shown on the flow sheets and are all of Figure 2 and the first portions of the process of Figure 1. The description which follows directly hereinafter is directed to the further process of Figure 1.

The circulin-containing carbon filter cake is eluted several times with an aqueous solvent, preferably 50 percent aqueous tertiary-butanol acidified to a pH within the range of 2 to 4 with sulfuric acid. Other concentrations of tertiary-butanol are effective, as are aqueous propanol, isopropanol, other isomeric butanols, pentanols and acetone. Ethanol is not satisfactory as an eluting agent nor are the hexanols of much practical value.

The eluates are concentrated to about 10 percent of their original volume, the eluting organic solvent being removed during the concentration. The excess sulfuric acid in the eluting solvent is neutralized by sodium or barium hydroxide, barium hydroxide being preferred as the excess sulfate ion precipitates barium sulfate which can be removed from the brew by filtration. The resulting solution may be used directly for further purification but is preferably frozen and dried, the resulting solid being redissolved for further purification.

The crude circulin as obtained can be converted to pure material by chromatography using activated carbon as the adsorbent and neutral or acid aqueous tertiary-butanol as the developing solvent.

Although circulin of satisfactory purity can be obtained by adsorption on carbon and elution with solvents containing acid, products of greater purity and potency can be more readily obtained and the overall yield of the process can be increased by extraction of the circulin as a complex from the fermentation brew with water-immiscible organic solvents. In practicing such alternative processes, which are represented in the flow sheets of Figures 2, 3 and 4, a sulfonated or sulfated surface-active agent is preferably added to the clarified or filtered brew, whereby the circulin complex precipitates. This precipitate can be separated from the brew and the circulin recovered therefrom. Some surface-active agents may not form complexes with circulin that are water-insoluble, but may nonetheless aid in the partition of the antibiotic substance between the aqueous and the water-immiscible solvent phases.

Sulfonated compounds which are surface-active agents and which form a complex with circulin are:

1. Dodecylbenzene sulfonic and similar alkylated aromatic sulfonic acids and water-soluble salts thereof, such as are available under the trade-names Santomerse D, Naccanol NR, Merpentine, Ahcowet, Aresklene, and Ultrawet 30DS.

2. Salts of sulfosuccinic and similar acids, such as the di-(2-ethylhexyl) ester of sodium sulfosuccinic acid that is available under the trade-name Aerosol OT or the corresponding diamyl ester which is available under the trade-name Aerosol AY.

3. Oleic acid esters of sulfonated aliphatic compounds such as $$CH_3(CH_2)_7CH=CH(CH_2)_7-COO-C_2H_4-SO_3Na$$

which is sold under the trade-name Artic Syntex A.

4. Sodium salts or aryl alkyl ether sulfates such as those available under the trade-name Triton.

5. Sulfonated naphthalene alkyl ethers such as are available under the trade-name Tenisol.

6. Aliphatic ester sulfates.

The precipitated complex of circulin and the sulfonated or sulfated surface-active agent can be separated from the fermentation brew by filtration (using Celite or other filter aids, if necessary) or centrifugation, and thereafter the circulin can be recovered therefrom by dissolving the precipitate in an organic solvent such as normal-butanol, amyl acetate or other suitable solvent such as methanol and chloroform, concentrating the solution by evaporation, preferably at subatmospheric pressure, followed by treatment of the solution with hydrogen chloride or concentrated hydrochloric acid. Alternatively, concentrated sulfuric acid may be added to form circulin sulfate at this point. In such treatment, acetone may be added to the normal-butanol to aid in the further precipitation of circulin hydrochloride.

Alternatively, the fermentation brew containing the circulin and surface-active agent, whether or not a complex is formed or precipitated therein, may be treated directly with normal-butanol, amyl acetate, chloroform or other water-immiscible solvent, whereby circulin is extracted therefrom.

The following examples are illustrative of the invention but are not to be construed as limiting.

EXAMPLE 1.—PREPARATION OF SEED CULTURES OF *Bacillus circulans* Purdue Q19u

The vegetative growth and spores of *Bacillus circulans* Purdue Q19u, grown on agar slants, was transferred to several 500-milliliter flasks, each containing 100 milliliters of the following medium:

| | |
|---|---|
| Rolled oats _____grams__ | 2.0 |
| Dextrin _____do____ | 2.0 |
| Ammonium sulfate $(NH_4)_2SO_4$_____do____ | 1.0 |
| Potassium chloride KCl_____do____ | 0.4 |
| Calcium carbonate $CaCO_3$_____do____ | 1.0 |
| Tap water q. s_____milliliters__ | 100 |

This medium was sterilized and inoculated from agar slants. It was shaken (aerated, submerged culture) for 48 hours at a temperature of 24 degrees centigrade. This culture of *Bacillus circulans* material can be used directly for the inoculation of circulin-producing tanks (Example 3) or for the production of a larger volume of inoculum (Example 2).

EXAMPLE 2.—PREPARATION OF INOCULUM

To six liters of a medium containing—

| | |
|---|---|
| Corn sugar _____grams__ | 20 |
| Dried brewer's yeast _____do____ | 20 |
| Ammonium sulfate $(NH_4)_2SO_4$_____do____ | 10 |
| Potassium chloride KCl_____do____ | 4.0 |
| Calcium carbonate $CaCO_3$_____do____ | 16.0 |
| Potassium dihydrogen phosphate $KH_2PO_4$___do____ | 0.2 |
| Water q. s_____liter__ | 1 | in a 5-gallon flask, equipped for agitation and aeration, was added five percent by volume of a seed culture obtained as described in Example 1. The inoculated medium was incubated at a temperature of 24 degrees centigrade, with aeration until visual observation of a sample showed the appearance of spores, at which time the broth culture is suitable for use to inoculate large tanks. The use of an inoculum containing many spores is to be avoided as inoculation with a completely sporulated culture results in a reduced production of circulin.

EXAMPLE 3.—PREPARATION OF CIRCULIN SULFATE

A. *Fermentation*

Two one-hundred-gallon fermentation tanks, each containing 240 liters of a medium containing per liter:

| | |
|---|---|
| Dextrin or starch_____grams__ | 20 |
| Ammonium sulfate $(NH_4)_2SO_4$_____do____ | 10 |
| Dried brewer's yeast_____do____ | 20 |
| Potassium chloride KCl_____do____ | 4.0 |
| Calcium carbonate $CaCO_3$_____do____ | 16.0 |
| Potassium dihydrogen phosphate $KH_2PO_4$___do____ | 0.2 |
| Water q. s_____liter__ | 1 | were inoculated with 400 milliliters each of shake flask cultures of *Bacillus circulans* Purdue Q19u obtained as described in Example 1. The inoculated medium was incubated for 88 hours at a temperature of 24 degrees centigrade with aeration and stirring. Assays of portions of the medium during fermentation showed the following quantities of circulin per milliliter of brew in the respective tanks:

| Hours | Run A-71, Units | Run A-72, Units |
|---|---|---|
| 48 | 1,190 | 1,270 |
| 64 | 1,150 | 1,260 |
| 88 | 1,127 | 1,247 |

B. *Isolation (flow sheet Figure 1)*

At the end of the fermentation period the contents of tanks A-71 and A-72 above were heated to 100 degrees centigrade for 10 minutes, which killed the organism, opened the bacterial cells and coagulated suspended material. The pH of each tank was adjusted to about 2.0 with concentrated sulfuric acid, about 2100 milliliters being required for each tank. The contents of each tank were then allowed to cool to about 25 degrees centigrade and to each was added with stirring, 10.6 kilograms (about 5 percent weight/volume) of a diatomaceous earth filter aid (Johns-Manville Celite-545), the suspension filtered and each filter cake washed with one-tenth volume (21 liters) of water.

The filtrates and washes were combined, the pH adjusted to 6.5 with sodium hydroxide, 1¼ kilograms of filter aid (Supercel) added and the suspension was filtered. A portion of the filtrate was withdrawn for other purposes, leaving 355 liters of clarified brew which contained, as shown by assay, 412 million units of circulin.

The circulin was adsorbed from the brew by the addition of 3.5 kilograms of activated carbon (Darco G60) and stirred for forty-five minutes. Eight hundred grams of a diatomaceous earth filter aid (Celite-545) was added, the suspension filtered and the filter cake washed free of sulfate ion with water and then 60 liters of 50 percent aqueous tertiary-butanol. The tertiary-butanol wash, containing 30.3 million units of circulin, was discarded.

The circulin adsorbed on the filter cake (contained on a plate and frame filter press) was eluted by circulating solvent through the filter press until equilibrium was reached and then withdrawing the eluting solvent. This elution was conducted stepwise, as follows:

*Eluate No. 1.*—Ten liters of water containing 500 milliliters of tertiary-butanol was circulated through the filter press, the tertiary-butanol remaining on the cake from the previous wash being sufficient to raise the tertiary-butanol content of the eluting solvent to 10 percent. Concentrated sulfuric acid was added to the circulating solvent until the pH remained constant at about pH 3.85. The eluting solvent, which was then withdrawn from the filter press, amounted to 10.5 liters and contained 42.5 million units of circulin. Assay of an aliquot portion showed the solids contained 530 units of circulin per milligram.

*Eluate No. 2.*—The filter cake remaining on the press was eluted by circulating 10 liters of 50 percent aqueous tertiary-butanol acidified to pH 4.0 with sulfuric acid through the press. When the eluting solvent was withdrawn a volume of 9 liters was obtained which contained 46.5 million units of circulin. Assay of an aliquot portion shows that the solids contained 1190 units of circulin per milligram.

*Eluate No. 3.*—The filter cake was eluted by circulating 10 liters of 50 percent tertiary-butanol acidified to pH 4.0 with sulfuric acid. When the eluting solvent was withdrawn there was obtained a volume of 8.5 liters containing 21.2 million units of circulin, the solids containing 1000 units of circulin per milligram.

*Eluate No. 4.*—The filter cake was eluted by circulating through the press 10 liters of 50 percent tertiary-butanol acidified to pH 2.8 with sulfuric acid. A volume of 9.75 liters of eluate was withdrawn which contained 19.8 million units of circulin, the solids assaying 695 units of circulin per milligram.

*Eluate No. 5.*—The filter cake was eluted as above with 10 liters of 50 percent tertiary-butanol acidified to pH 2.2 with concentrated sulfuric acid. There was collected 9.5 liters of solvent containing 13.3 million units of circulin, the solids assaying 480 units of circulin per milligram.

The five eluates were combined and concentrated under reduced pressure to a volume of 4.5 liters. Barium hydroxide solution was added until the solution had a pH of 6.0, the excess sulfate ion not combined with circulin being removed by filtration as barium sulfate (sulfate ion attached to circulin is removed at pH values of about 11.0). The suspension was filtered to remove the precipitated barium sulfate and the filtrate was frozen and dried. There was obtained 147.0 grams of crude circulin sulfate assaying 880 units of circulin per milligram, a recovery of 34 percent of the total activity.

C. Purification

1. PREPARATION OF AN ACTIVATED CARBON COLUMN

One thousand grams of an acid washed, heat-activated carbon (Darco G60), 1000 grams of a diatomaceous earth filter aid (Celite–545) and 6 liters of water were thoroughly mixed. Sulfuric acid was added during the mixing until the pH of the supernatant liquid remained constant at a pH of 3.93. The suspension was filtered, the filter cake resuspended in 3.0 liters of water acidified to pH 4.0 with sulfuric acid, filtered, and the filter cake washed twice with one-liter portions of water acidified to pH 4.0 with sulfuric acid. The carbon-diatomaceous earth mixture was suspended in a small amount of aqueous sulfuric acid (pH 4.0) and placed in an upright glass column, 10 x 125 centimeters, equipped with a retaining plate and stopcock for liquid withdrawal at the bottom and a closed top with stopcocks adapted for the addition of liquids and air under a pressure of 10 to 25 pounds per square inch. The carbon-diatomaceous earth mixture occupied a height in the column of 62.5 centimeters and had a liquid holdup of 4.5 liters.

2. CHROMATOGRAPHY OF CIRCULIN SULFATE

The 147 grams of crude circulin sulfate obtained in Example 3B was dissolved in 520 milliliters of dilute sulfuric acid having a pH of 4.3 and placed on the activated carbon column above. The outlet was adjusted to deliver 0.5 milliliter per square centimeter per minute, a total flow of 39.3 milliliters per minute, under a pressure of about 20 pounds per square inch.

The 520 milliliters of circulin sulfate solution was followed by 5000 milliliters of dilute sulfuric acid (pH 4.0) and then aqueous 25 percent tertiary-butanol acidified to pH 4.0 with sulfuric acid. The solutions after passing through the column were withdrawn at the bottom, pooled, the solvent removed and the dried solids thus obtained assayed for circulin. The results obtained were as follows:

| Volume of Fraction (Milliliters) | Grams of Solids | Activity per Milligram |
| --- | --- | --- |
| 9,000 | 28.14 | 0 |
| 400 | 7.62 | 185 |
| 1,000 | 5.60 | 1,465 |
| 2,800 | 20.4 | 3,300 |
| 4,200 | 9.3 | 1,075 |
| 1,800 | 1.87 | 575 |

The material having an activity of 3300 units per milligram, after a second chromatographic absorption, yielded circulin sulfate having an activity of approximately 5000 to 6000 units per milligram whose activity was not increased by further treatment.

EXAMPLE 4.—PREPARATION AND PURIFICATION OF CIRCULIN HYDROCHLORIDE

A. Fermentation

Two one-hundred-gallon fermentation tanks, each containing 240 liters of a medium having the following composition:

| | |
| --- | --- |
| Rolled oats | grams 20 |
| Dextrin | do 20 |
| Ammonium sulfate (NH$_4$)$_2$SO$_4$ | do 10 |
| Potassium chloride KCl | do 4.0 |
| Calcium carbonate CaCO$_3$ | do 5.0 |
| Potassium dihydrogen phosphate KH$_2$PO$_4$ | do 0.4 |
| Water q. s | liter 1.0 | which medium was adjusted to a pH of 6.7 with sulfuric acid and sterilized, were inoculated with 12.0 liters each of a vegetative inoculum of *Bacillus circulans* Purdue Q19u obtained as described in Example 2. The inoculated medium was incubated for 72 hours at 24 degrees centigrade with stirring and sterile air was charged thereto at a rate of 144.0 liters per minute. Assays of portions of the medium during fermentation shows the following quantities of circulin per milliliter of brew in each tank:

| Hours | Run A-119, Units | Run A-120, Units |
| --- | --- | --- |
| 48 | 4,800 | 4,590 |
| 65 | 4,860 | 4,760 |

B. Isolation (flow sheets Figures 2 and 3)

At the end of the 72-hour fermentation period the contents of the two tanks were heated to 100 degrees centigrade for 10 minutes, which killed the organism, opened the bacterial cells and coagulated suspended material. The contents of each tank were cooled to about 60 degrees centigrade and to each was added, with stirring, about 10.5 kilograms of a diatomaceous earth filter aid (Johns-Manville Celite–545) and the suspension was filtered. There was obtained a total of 400 liters of filtered brew containing 1385 million units of circulin.

One liter of Ultrawet 30DS (solution of mixed sodium salts of alkylated aromatic sulfonic acids containing approximately 25 percent active sulfonate), 4.0 kilograms of activated carbon (Darco G60) and 4.0 kilograms of a diatomaceous earth filter aid (Celite–545) were added, with stirring, to 200 liters of the filtered brew and the resulting suspension filtered on a plate and frame filter press.

The filter cake was eluted once with 20 liters of tertiary-butanol acidified to pH 1.7 with sulfuric acid and three additional times with 22-liter portions of 50 percent tertiary-butanol acidified to pH 1.9 with sulfuric acid. The eluates were combined, the pH adjusted to 5.0 with 110 milliliters of saturated sodium hydroxide solution and concentrated to a volume of 4.5 liters under a pressure of 4 inches of mercury and at a temperature of 45 degrees centigrade.

To the concentrated eluates was added a solution of 500 grams of picric acid dissolved in one liter of acetone. The acetone was removed at subatmospheric pressure and the circulin picrate, which had separated, was collected and washed with 5 liters of water. The circulin picrate was dissolved in 15 liters of acetone, the solution filtered, and concentrated hydrochloric acid (or dry hydrogen chloride) was added to the filtered acetone solution until the precipitation of circulin hydrochloride was complete, 55 milliliters of concentrated hydrochloric acid being required. The precipitated circulin hydrochloride was collected, washed with 3 liters of acetone and then dissolved in 2.5 liters of water. The pH of the solution was adjusted to 6.8 with saturated sodium hydroxide solution and filtered and the filtrate was subsequently frozen and dried. There was obtained 106 grams of crude circulin hydrochloride which assayed 2015 units of circulin per milligram, a recovery of 23 percent of the total activity.

C. Purification of circulin hydrochloride

A mixture of 1200 grams of activated carbon (Darco G60), 1200 grams of a diatomaceous earth (Celite) and 700 milliliters of acidified distilled water having a pH of 4.75, were placed in the glass column described in Example 3C. The solids occupied a height in the column of 62.5 centimeters and had a liquid holdup of 5000 milliliters.

A solution of 148.0 grams of the circulin hydrochloride above (activity 2015 units per milligram) in 275 milliliters of 10 percent aqueous tertiary-butanol, which now assayed 1720 units per milligram or a total of 255 million units, was added to the column, washed down and developed with aqueous 10 percent tertiary-butanol under a pressure of 10 pounds per square inch. The solutions after passing through the column were withdrawn at the bottom, pooled, the solvent removed and the dried solids thus obtained assayed for circulin. The results obtained were as follows:

| Milliliters of Solution | Grams of Solid | Activity in Units per milligram |
| --- | --- | --- |
| 6,750 | 31.4 | 0 |
| 500 | 2.5 | 2,430 to 2,600 |
| 6,500 | 23.0 | 5,675 to 6,300 |
| 1,500 | 2.14 | 5,900 to 6,300 |

There was thus obtained 25.14 grams of circulin hydrochloride having an activity of 5700 to 6300 units per milligram. Further chromatography of this material has not increased the units of activity per milligram.

EXAMPLE 5.—FLOW SHEETS FIGURES 2 AND 4

A fermenter containing 240 liters of the medium described in Example 4 was inoculated and incubated as described in Example 4, assays of the brew for circulin showed the following quantities of circulin per milliliter of brew: 48 hours, 2280 units; 64 hours, 3680 units.

At the end of the fermentation period the contents of the fermenter were heated to 100 degrees centigrade for ten minutes, cooled to 60 degrees centigrade, 10 kilograms of a diatomaceous earth filter aid (Celite–545) added, the suspension filtered and the filter cake washed with water. The filtrate and washings were combined, one liter of Ultrawet 30DS (as in Example 4), 4 kilograms of activated carbon (Darco G60) and 2 kilograms of a diatomaceous earth filter aid were added and the suspension stirred for thirty minutes and filtered in a plate and frame filter press. The filter cake was eluted three times with respectively 22, 15 and 15 liter portions of 80 percent acetone acidified to pH 2.0 with sulfuric acid and then with 15 liters of water. The acetone eluates were combined and then divided into two equal portions for further treatment. The water wash (13.5 liters) was further treated by adding sixty-seven and one-half liters of acetone. The crude circulin sulfate which precipitated was collected, dissolved in water, the solution filtered, the pH of the filtrate adjusted to pH 5.5 with sodium hydroxide solution, filtered again, and the filtrate was frozen and dried. There was obtained 37.5 grams of solid assaying 650 units of circulin per milligram.

One-half of the acetone eluates (24.75 liters) containing 77.2 million units of circulin was neutralized to pH 6.5 and concentrated to a volume of 4.0 liters under subatmospheric pressure. The concentrated, acetone-free solution was extracted twice with 4-liter portions of n-butanol, the butanol extracts combined and extracted twice with 2-liter portions of dilute sulfuric acid having a pH of 1.2. The butanol which had dissolved in the water was removed by distillation at subatmospheric pressure, the resulting aqueous solution, amounting to 4.75 liters, was neutralized to pH 5.0 with sodium hydroxide solution, and was subsequently frozen and dried. There was obtained 95 grams of solid assaying 170 units of circulin per milligram.

To the second half of the acetone eluate (24.75 liters) was added 99 liters of acetone, the circulin sulfate which precipitated was collected, dissolved in water and the cloudy solution filtered. The pH of the filtrate was adjusted to 5.5 with sodium hydroxide, and it was filtered to remove a small amount of precipitate, and was thereafter frozen and dried. There was obtained 36.5 grams of solid assaying 1440 units of circulin per milligram.

EXAMPLE 6.—FLOW SHEETS FIGURES 2 AND 4

A fermenter containing 215 liters of the medium described in Example 4 was inoculated and incubated as described in Example 4. Assays of the brew for circulin showed 4080 units per milliliter or 880 million units after 64 hours.

At the end of the fermentation period the contents of the fermenter were heated to 100 degrees centigrade for ten minutes, cooled to 35 degrees centigrade, 10 kilograms of diatomaceous earth filter aid (Celite–545) added, the suspension filtered and the cake washed with sufficient water to bring the volume of the filtrate to 215 liters.

One and seven-tenths liters of Ultrawet 30DS (as in Example 4) were added and the suspension was stirred for ten minutes; 2150 grams of diatomaceous earth filter aid (Supercel) were then added, the suspension stirred for ten minutes and an additional 4300 grams of diatomaceous earth filter aid was added and the suspension stirred for ten minutes, and the whole was filtered in a plate and frame filter press. The filter cake was eluted three times with respectively 30, 20 and 20-liter portions of 80 percent acetone acidified to a pH between 1.5 and 1.85 with sulfuric acid. The volume of the pooled eluates was 62.0 liters and its circulin content was 658 million units.

The residual cake was washed with 31 liters of water acidified to pH 1.6 with sulfuric acid, the eluate containing 71 million units of circulin.

To the 62 liters of 80 percent acetone eluate above, 248 liters of acetone and 150 grams of diatomaceous earth (Supercel) were added and the suspension was filtered. The filter cake was suspended in 1750 milliliters of water, which dissolved the circulin, and filtered. The pH of the filtrate was adjusted to 5.2 with 14 milliliters of saturated sodium hydroxide, filtered, and the residue washed with 400 milliliters of water. The filtrates and washings were combined, frozen and dried from the frozen state and 143.5 grams of circulin having a potency of 4640 units per milligram was obtained.

To the 31 liters of water wash, following the acetone elution above, was added 124 liters of acetone and 100 grams of diatomaceous earth (Supercel) and the suspension filtered. The filter cake was suspended in one liter of water, the suspension filtered and the residue washed with 100 milliliters of water. The pH of the filtrate was adjusted to 5.7 with sodium hydroxide solution, 50 grams of diatomaceous earth filter aid (Supercel) was added, the suspension filtered and the filtrate was frozen and dried. There was obtained 47.0 grams of circulin having a potency of 1017 units per milligram.

The process in accordance with this example gives a higher yield and the product is of greater purity than that of any of the examples hereinbefore.

Reference is made herein to the applications of Philip A. Tetrault, Serial No. 91,857, now Patent No. 2,676,133, and Donald R. Colingsworth, Serial No. 91,859, now Patent No. 2,686,753, each filed concurrently herewith, in which is claimed subject matter disclosed but not claimed herein.

The term "circulin" is used herein and in the appended claims in the same sense that the term is used in application Serial No. 91,857, above identified, to refer to a substance which—

(a) Is effective in inhibiting the growth of Gram-Negative bacteria;
(b) Is a basic polypeptide containing leucine, threonine, alpha, gamma-diaminobutyric acid and an optically active isomer of pelargonic acid;
(c) Contains free amino groups, as determined by the Van Slyke reaction;
(d) Forms salts with acids;
(e) Has an amino nitrogen analysis of 7.5 percent before hydrolysis and 15.8 percent after hydrolysis;
(f) Is substantially destroyed by crude trypsin and lipase;
(g) Forms a sulfate salt that is an amorphous solid soluble in water and to a lesser degree soluble in lower alcohols and insoluble in acetone and water-immiscible solvents, the sulfate salt having a melting point of 226 to 228 degrees centigrade, a specific rotation $[\alpha]_D^{25}$ of minus 61.6 degrees (C=1.25 in water); and
(h) Forms a hydrochloride salt exhibiting in a mineral oil suspension a characteristic absorption in the infrared region of the spectrum at the following wave lengths in microns: 2.9, 3.1, 4.4, 5, 5.6, 6, 6.3, 6.6, 7.2, 7.3, 7.6, 8.2, 8.5, 8.7, 9.8, 10.1, 10.8, 11.3, 11.9, 12.9, 13.2, 14 and 15 as shown in Figure 1 of the drawing accompanying said application Serial No. 91,857.

Inasmuch as the foregoing description comprises preferred embodiments of the invention, it is to be understood that modifications and alterations may be made therein in conventional manner in accordance with the principles herein described, and that the invention is not to be limited except as defined in the appended claims.

We claim:
1. A process for the recovery of circulin from a fermentation borth containing the same which comprises: precipitating the circulin from the broth with an anionic sulfonyl-radical containing surface-active agent, separating the precipitate from the remaining broth and recovering the circulin from the precipitate.

2. A process as defined in claim 1 in which the surface-active agent is a member of the group consisting of alkylated aromatic sulfonic acids and salts thereof, salts of sulfosuccinic acids, oleic acid esters of sulfonated aliphatic compounds, sodium salts of aryl alkyl ether sulfates, sulfonated naphthalene alkyl ethers and aliphatic ester sufates.

3. The process of claim 1 in which the circulin is recovered as a useful salt.

4. A process for the recovery of circulin from a fermentation broth containing the same which comprises: filtering the broth and precipitating the circulin from the filtered broth in the form of a complex with an alkylated aromatic sulfonic acid, separating the precipitated circulin complex and dissolving the precipitate in a solvent of the group consisting of acidified aqueous acetone and aliphatic alcohols having from 3 to 5 carbon atoms, inclusive, in the molecule.

5. A process for the recovery of circulin from a fermentation broth obtained by the culture of a circulin-producing strain of Bacillus circulans upon a carbohydrate-containing medium, which comprises: filtering the broth and subsequently adding thereto an alkylated aromatic sulfonic acid, separating the precipitated circulin sulfonate complex and eluting the same with an aqueous solution of a solvent of the group consisting of acetone and water-miscible monohydric alcohohls having from 3 to 5 carbon atoms, inclusive, in the molecule, and thereafter recovering circulin from the resulting solution.

6. A process as defined in claim 5 in which the circulin is recovered from the solution in the solvent by precipitating it with picric acid.

7. A process as defined in claim 5 in which the circulin is recovered from the solution in the solvent by precipitating it with acetone.

8. A compound of the group consisting of complexes of circulin with surface-active agents of the group consisting of alkylated aromatic sulfonic acids and salts thereof, salts of sulfonsuccinic acids, oleic acid esters of sulfonated aliphatic compounds, sodium salts or aryl alkyl ether sulfates, sulfonated naphthalene alkyl ethers and aliphatic ester sulfates.

9. A complex of circulin with an anionic sulfonyl-radical containing surface active agent.

References Cited in the file of this patent
UNITED STATES PATENTS

| | | |
|---|---|---|
| 2,438,209 | Fraenkel-Conrat | Mar. 23, 1948 |
| 2,457,887 | Goorley | Jan. 4, 1949 |
| 2,676,133 | Tetrault | Apr. 20, 1954 |

OTHER REFERENCES

Stansly on Polymyxin in Bulletin Johns Hopkins Hospital, vol. 81, pub. September 11, 1947, pages 43–54.

Anker on Bacitracin in J. Bact., vol. 55, February 1948, pages 249–255.

Shepherd on Polymyxin in J. A. C. S., vol. 70, November 1948, pages 3771–3774.

Dufrenoy: "Antibiotics," 1949, page 190.

Bergey: "Manual of Determinative Bacteriology," 6th ed., 1948, pages 722, 723.

McLeod on Circulin in J. Bact., vol. 56, December 1948, pages 749–754.

Garson et al. in J. Bact., vol. 58, July 1949 in Notes, pages 115, 116.

Peck on Streptothricin in J. A. C. S., vol. 68, May 1946, pages 772–776.

"A Dictionary of Antibiosis," Columbia University Press, 1951, pp. 75 and 231.

Fried: J. Biol. Chem., vol. 168, pp. 391–394.

Kuehl et al.: JACS, August 1946, vol. 68, pp. 1460–1462.

Junowicz-Kocholaty et al.: J. Biol. Chem., pp. 760–764, May 1947.

Dowling et al.: Article in Science, vol. 116, No. 3006, pages 147–148, Aug. 8, 1952. (Copy in P. O. S. L.)